(12) United States Patent
Naeini et al.

(10) Patent No.: US 9,608,672 B2
(45) Date of Patent: Mar. 28, 2017

(54) APPARATUS AND METHOD FOR GENERATING BASE BAND RECEIVE SIGNALS

(71) Applicant: Intel IP Corporation, Santa Clara, CA (US)

(72) Inventors: Ashkan Naeini, Munich (DE); Gerhard Mitteregger, Taufkirchen (DE); Zdravko Boos, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/835,851

(22) Filed: Aug. 26, 2015

(65) Prior Publication Data

US 2016/0094249 A1    Mar. 31, 2016

(30) Foreign Application Priority Data

Sep. 26, 2014    (DE) .......................... 10 2014 114 044

(51) Int. Cl.
   *G06F 3/033*    (2013.01)
   *H04B 1/00*    (2006.01)
   (Continued)

(52) U.S. Cl.
   CPC .......... *H04B 1/0053* (2013.01); *H04B 1/006* (2013.01); *H04B 1/0021* (2013.01); *H04L 5/143* (2013.01);
   (Continued)

(58) Field of Classification Search
   CPC .......... H04L 27/06; H04L 27/32; H04L 27/26
   (Continued)

(56) References Cited

U.S. PATENT DOCUMENTS

| 7,924,946 | B2* | 4/2011 | Chang | .................... | H04B 1/302 |
| | | | | | 375/316 |
| 8,774,328 | B2* | 7/2014 | Elenes | .................... | H04H 20/30 |
| | | | | | 375/316 |
| 2007/0140382 | A1* | 6/2007 | Qian | ........................ | H04B 1/30 |
| | | | | | 375/332 |

OTHER PUBLICATIONS

Gupta, et al. "Digital Channelizing Radio Frequency Receiver." IEEE Transactions on Applied Superconductivity, vol. 17, No. 2, Jun. 2007, pp. 430-437.

(Continued)

*Primary Examiner* — Sonny Trinh
(74) *Attorney, Agent, or Firm* — Eschweiler & Potashnik, LLC

(57) ABSTRACT

An apparatus for generating base band receive signals includes a first analog-to-digital converter module generating a first digital high frequency receive signal at least by sampling a first analog high frequency receive signal, a first digital signal processing module generating a first base band receive signal based on the first digital high frequency receive signal, a second analog-to-digital converter module generating a second digital high frequency receive signal at least by sampling a second analog high frequency receive signal and a second digital signal processing module generating a second base band receive signal based on the second digital high frequency receive signal. The first analog high frequency receive signal comprises first payload data at a first receive channel associated with a first carrier frequency and the second analog high frequency receive signal comprises second payload data at a second receive channel associated with a second carrier frequency.

22 Claims, 8 Drawing Sheets

(51) Int. Cl.
     *H04L 27/00*        (2006.01)
     *H04L 5/14*         (2006.01)
     *H04L 27/38*        (2006.01)
     *H04L 27/26*        (2006.01)

(52) U.S. Cl.
     CPC .......... *H04L 27/0002* (2013.01); *H04L 27/38* (2013.01); *H04L 27/261* (2013.01)

(58) Field of Classification Search
     USPC ....... 455/130, 132, 7, 45; 375/316, 147, 136
     See application file for complete search history.

(56) References Cited

OTHER PUBLICATIONS

Nordebo, Sven. "Signal processing antennas I." Jan. 19, 2004, 108 pages.

\* cited by examiner

APPARATUS AND METHOD FOR GENERATING BASE BAND RECEIVE SIGNALS

CROSS REFERENCE TO RELATED APPLICATIONS

This application claims priority to German Application number 102014114044.3, filed on Sep. 26, 2014, the contents of which are herein incorporated by reference in its entirety.

FIELD

The present disclosure relates to the signal processing of multiple receive signals within communication systems and in particular to an apparatus and method for generating multi carrier base band receive signals.

BACKGROUND

In recent years, a strongly increasing demand for high transmission bandwidths within wireless communication systems is observed. To achieve a higher data throughput some modern cellular communication systems like LTE (long term evolution) and UMTS (Universal Mobile Telecommunications System) have increased the transmission bandwidth over those that can be supported by originally defined single channel or carrier. This multi-carrier method being proposed is generally termed Carrier Aggregation (CA). Those carriers can be allocated contiguous or non-contiguous in the same band (intraband CA) or even in different bands (interband CA). The information transmitted through all these carriers has to be recovered at the receiver. It is desired to recover information transmitted through various channels with low spurious generation at low power consumption and with low hardware efforts.

SUMMARY

There is a demand for providing a concept for generating multi carrier base band receive signals, which may enable the generation of base band signals with low power consumption and/or low hardware efforts and/or reduce or avoid synthesizer crosstalk.

This demand may be satisfied by the subject matter of the claims.

BRIEF DESCRIPTION OF THE DRAWINGS

Some examples of apparatuses and/or methods will be described in the following by way of example only, and with reference to the accompanying figures, in which.

DETAILED DESCRIPTION

Figure 1:
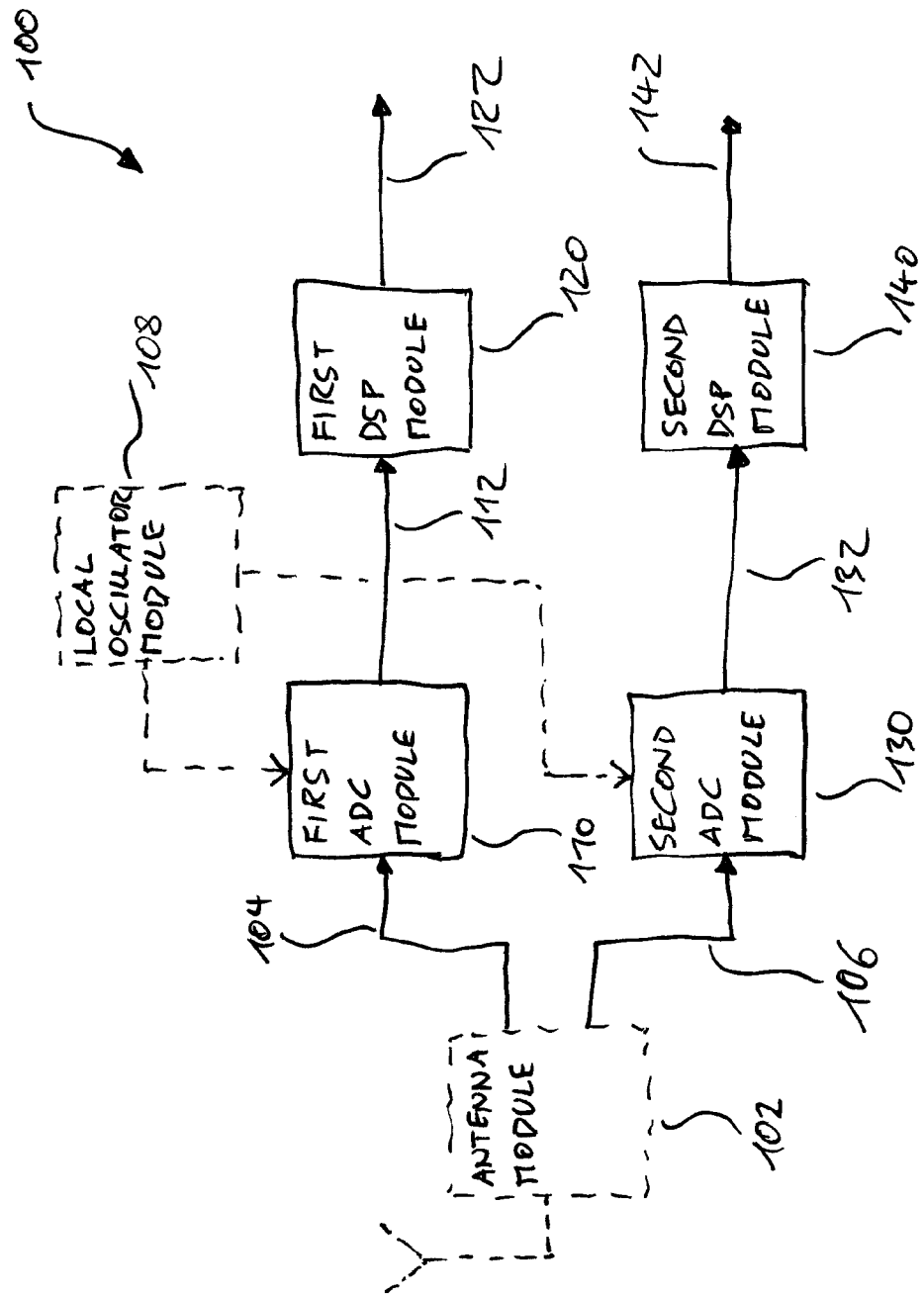
FIG. 1 shows a block diagram of an apparatus for generating base band receive signals.

Various examples will now be described more fully with reference to the accompanying drawings in which some examples are illustrated. In the figures, the thicknesses of lines, layers and/or regions may be exaggerated for clarity.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following, various examples relate to devices (e.g. cell phone, base station) or components (e.g. receiver, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 shows a block diagram of an apparatus 100 for generating base band receive signals according to an example. The apparatus 100 comprises a first analog-to-digital converter module 110, a first digital signal processing module 120, a second analog-to-digital converter module 130 and a second digital signal processing module 140. The first analog-to-digital converter module 110 generates a first digital high frequency receive signal 112 at least by sampling a first analog high frequency receive signal 104. The first analog high frequency receive signal 104 comprises or contains first payload data at a first receive channel associated with a first carrier frequency. Further, the first digital signal processing module 120 generates a first base band receive signal 122 based on the first digital high frequency receive signal 112. The second analog-to-digital converter module 130 generates a second digital high frequency receive signal 132 at least by sampling a second analog high frequency receive signal 106. The second analog high frequency receive signal 106 comprises or contains second payload data at a second receive channel associated with a second carrier frequency. Further, the first carrier frequency differs from the second carrier frequency. The second digital signal processing module 140 generates a second base band receive signal 142 based on the second digital high frequency receive signal 132.

By the introduction of a multi-carrier direct RF (radio frequency) sampling, for example, a very power efficient solution for CA (carrier aggregation) systems may be provided. A channel selective digital down-conversion may save plenty power and may relax the required dynamic range for the ADC (analog-to-digital converter), for example. The extremely high power efficiency may make a direct sampling of input RF signal feasible and may obsolete the need for any analog IF (intermediate frequency) mixer.

The first analog high frequency receive signal 104 and the second analog high frequency receive signal 106 may be signals derived from one or more radio frequency signals received through one or more antennas or one or more input interfaces. For example, a multi carrier radio frequency signal containing payload data within different frequency bands is received through an antenna. The multi carrier radio frequency signal may be provided through an antenna switch and one or more duplexer units to one or more low noise amplifiers, for example. The one or more antennas, the one or more antenna switches and/or the one or more duplexer units may be part of an antenna module 102. The antenna module 102 may be part of the apparatus 100 or may be an external module connected to the apparatus 100. The one or more low noise amplifiers may output the first analog high frequency receive signal 104 to the first analog-to-digital converter module 110 and the second analog high frequency receive signal 106 to the second analog-to-digital converter module 130. In other words, the first analog high frequency receive signal 104 and the second analog high frequency receive signal 106 may be derived from the same receive signal. Alternatively, the first analog high frequency receive signal 104 and the second analog high frequency receive signal 106 may be derived from different receive signals received through different antennas or input interfaces.

The first analog high frequency receive signal 104 and the second analog high frequency receive signal 106 may be signals in the radio frequency domain with frequencies between 100 MHz and 6 GHz, for example. For example, radio frequency bands may be located between 700 MHz and 1 Ghz, between 1.7 GHz and 1.9 Ghz and/or 2.5 GHz and 2.7 GHz.

For example, the first analog high frequency receive signal 104 and the second analog high frequency receive signal 106 comprise payload data to be recovered at the same frequencies as the one or more radio frequency receive signals received through one or more antennas, from which the first analog high frequency receive signal 104 and the second analog high frequency receive signal 106 are derived. For example, the first analog-to-digital converter module 110 may (directly sample) the receive signal represented by the first analog high frequency receive signal 104 without previous frequency conversion and the second analog-to-digital converter module 130 may (directly sample) the receive signal represented by the second analog high frequency receive signal 106 without previous frequency conversion.

The first analog high frequency receive signal 104 and the second analog high frequency receive signal 106 contain payload data at various and/or different receive channels. Each receive channel may be associated with a different carrier frequency. For example, the first receive channel may located at the first carrier frequency within the first analog high frequency receive signal 104 and the second receive channel may be located at the second carrier frequency within the second analog high frequency receive signal 106. For example, the carrier frequency of a receive channel may be a center frequency of the frequency band of the receive channel. In other words, the payload data transmitted through a specific channel may be modulated onto a carrier frequency associated to the specific channel. The payload data may be data to be recovered in the baseband domain. The first receive channel and the second receive channel may be receive channels of different transmission bands (e.g. interband carrier aggregation) or of the same transmission band (e.g. intraband carrier aggregation).

The first analog-to-digital converter module 110 and the second analog-to-digital converter module 130 at least sample the analog high frequency receive signals to obtain digital high frequency receive signals. Additionally, the first analog-to-digital converter module 110 and the second analog-to-digital converter module 130 may further process the analog high frequency receive signals (e.g. filter) to obtain the digital high frequency receive signals.

The first digital signal processing module 120 and the second digital signal processing module 140 may generate base band receive signals based on the digital high frequency receive signals provided by the first analog-to-digital converter module 110 and the second analog-to-digital converter module 130. The base band receive signals may comprise a sample frequency or a bit rate to be used in the base band domain. For example, a baseband frequency of the base band domain may be below 500 MHz (e.g. below 300 MHz or below 200 MHz, e.g. between 100 MHz and 200 MHz).

The first digital signal processing module 120 generates the first base band receive signal 122 so that the first base band receive signal 122 contains the first payload data. Further, the second digital signal processing module 140 generates the second base band receive signal 142 so that the second base band receive signal 142 contains the second payload data.

For example, the first analog high frequency receive signal 104, the second analog high frequency receive signal 106, the first digital high frequency receive signal 112 and the second digital high frequency receive signal 132 may be real valued signals, while the first base band receive signal 122 and the second base band receive signal 142 may be complex valued signals comprising a first phase component (e.g. in-phase signal) and a second phase component (e.g. quadrature-phase signal).

The first analog-to-digital converter module 110 and the second analog-to-digital converter module 130 may each comprise or may each be a direct conversion ADC, a ramp-compare ADC, a delta encoded ADC, a delta sigma ADC or a time-interleaved ADC, for example.

For example, the first analog-to-digital converter module 110 may sample the first analog high frequency receive signal 104 with a first sampling frequency of more than 4 times the first carrier frequency. In this case, the whole frequency band up to 2 times the carrier frequency may be sampled. For example, nyquist ADC or ramp-compare ADC may be used. The over four times oversampling may enable an ideal digital I/O demodulation going around any IQ imbalances and impairments cased in other IQ downconverter mixer, for example.

Alternatively, the first analog-to-digital converter module 110 and/or the second analog-to-digital converter module 130 may comprise an oversampling ADC like delta sigma ADC. By using a delta sigma ADC, it may be sufficient to sample the analog signal with a lower sampling frequency, which may be adapted to a bandwidth of the receive channel of interest.

For example, the first analog-to-digital converter module 110 may sample the first analog high frequency receive signal 104 with a first sampling frequency of more than 4 times (e.g. for subsequent differential I/O conversion, I+, Q+, I−, Q−) a band width of the first receive channel. Additionally, the second analog-to-digital converter module 130 may sample the second analog high frequency receive signal 106 with a second sampling frequency of more than 4 times a band width of the second receive channel. Higher frequencies may be used to obtain a sufficient over sampling of a delta sigma ADC (e.g. 8 times, 16 times, 32 times or higher bandwidth of the respective receive channel).

Optionally, the first sampling rate may be larger than $4/M*f_{max,rx}$. In this example, $f_{max,rx}$ is the highest carrier frequency of a receive channel with payload data to be converted to the base band domain and M is an integer (e.g. lower than 10, for example, 7, 5 or 3). The integer M may define a degree of subsampling. For example, it may be assumed that the first carrier frequency is the highest carrier frequency of a receive channel processed by the apparatus 100, although also another receive channel may be the one associated to the highest carrier frequency.

For example, the first analog-to-digital converter module 110 comprises a first delta sigma analog-to-digital converter and the second analog-to-digital converter module 130 comprises a second delta sigma analog-to-digital converter. A filter characteristic of the first delta sigma analog-to-digital converter may differ from a filter characteristic of the second delta sigma analog-to-digital converter. The filter characteristic of the first delta sigma analog-to-digital converter may be adapted to the first receive channel and the filter characteristic of the second delta sigma analog-to-digital converter may be adapted to the second receive channel. For example, for an LTE20 receive channel with a bandwidth of 20 MHz, the filter characteristic of the delta sigma analog-to-digital converter may comprise a pass band with a bandwidth between 20 MHz and 30 MHz (e.g. 20 MHz).

For example, a pass band of a loop filter of the first delta sigma analog-to-digital converter may differ from a pass band of a loop filter of the second delta sigma analog-todigital converter. For example, the first carrier frequency may be located within the pass band of the loop filter of the first delta sigma analog-to-digital converter and the second carrier frequency may be located within the pass band of the loop filter of the second delta sigma analog-to-digital converter.

By using delta sigma analog-to-digital converters with filter characteristics adapted to the respective receive channels, the power consumption of the analog to digital conversion may be kept low.

For example, the first digital high frequency receive signal 112 and the second digital high frequency receive signal 132 may be generated without using an analog mixer. For example, the complete analog to digital conversion of a receiver or a transceiver comprising the proposed apparatus 100 may be done without using an analog mixer. In other words, by implementing the proposed apparatus 100 within a receiver or transceiver, analog mixers may be avoided for the receive paths.

The first digital signal processing module 120 and the second digital signal processing module 140 may comprise in-phase-quadrature-phase generator modules, fractional sampling rate convert module, digital down mixing modules and/or decimation modules to generate the baseband receive signals. An in-phase-quadrature-phase generator module may generate an in-phase signal and a quadrature-phase signal based on a real valued signal (e.g. by using a multiplexer). A fractional sampling rate convert module may convert a sample frequency of a signal to a non-integer divided sample frequency. In other words, the sampling frequency of the input signal of the fractional sampling rate convert module may be a non-integer multiple of a sampling rate of the generated output signal of the fractional sampling rate convert module. Further, a digital down mixing module may mix a frequency range of a digital high frequency receive signal containing payload data of interest to a frequency range within the baseband frequency range. A decimation module may reduce a high sample frequency of a signal to a low sample frequency with the high sample frequency being an integer multiple of the low sample frequency.

The apparatus 100 may further comprise a local oscillator generator module 108 or may be connected to a local oscillator generator module 108. The local oscillator generator module 108 may provide different or independent oscillator signals with different oscillator frequencies to the first analog-to-digital converter module 110 and the second analog-to-digital converter module 130 resulting in different sampling frequencies. In this way, oscillator signals adapted to the respective receive channels may be provided, which may result in a lower power consumption.

Alternatively, the local oscillator generator module 108 may provide the same local oscillator signal with a first oscillator signal frequency to the first analog-to-digital converter module 110 and the second analog-to-digital converter module 130. Consequently, the first analog-to-digital converter module 110 may sample the first analog high frequency receive signal 104 with the first oscillator signal frequency and the second analog-to-digital converter module 130 may sample the second analog high frequency receive signal 106 with the same first oscillator signal frequency. For example, a single oscillator signal generator (e.g. phase-locked-loop circuit, digital to time converter module or non-tunable clock generator) may be sufficient for providing the same oscillator signal to all ADCs of the apparatus. In this way, the hardware effort for the local oscillator generator module and/or crosstalk may be reduced.

Alternatively, the local oscillator generator module 108 may provide a first local oscillator signal with a first oscillator signal frequency to the first analog-to-digital converter module 110 and a second local oscillator with a second oscillator signal frequency to the second analog-to-digital converter module 130. The first oscillator signal frequency may be an integer multiple of the second oscillator signal frequency. Consequently, the first analog-to-digital converter module 110 may sample the first analog high frequency receive signal 104 with the first oscillator frequency and the second analog-to-digital converter module 130 may sample the second analog high frequency receive signal 106 with the second oscillator signal frequency. For example, the local oscillator generator module 108 may comprise a divider dividing the first oscillator signal frequency of the first oscillator signal by an integer to obtain the second oscillator signal. For example, a single oscillator signal generator (e.g. phase-locked-loop circuit) may be sufficient for providing the oscillator signals comprising frequencies being integer multiples of a specific frequency to all ADCs of the apparatus. In this way, the hardware effort for the local oscillator generator module, the power consumption of the apparatus and/or crosstalk may be reduced.

Optionally, the apparatus 100 may comprise more than two receive paths for more than two different receive channels. For example, the apparatus may comprise a third analog-to-digital converter module generating a third digital high frequency receive signal at least by sampling a third analog high frequency receive signal. The third analog high frequency receive signal may contain third payload data at a third receive channel associated with a third carrier frequency. The third carrier frequency may differ from the first carrier frequency and the second carrier frequency. Further, the apparatus 100 may comprise a third digital signal processing module generating a third base band receive signal based on the third digital high frequency receive signal. Additional aspects or details regarding the third analog-to-digital converter module, the third analog high frequency receive signal, the third digital high frequency receive signal, the third digital signal processing module and/or the third base band receive signal may be similar to the corresponding features described above or below.

Optionally, first analog-to-digital converter module 110, the first digital signal processing module 120, the second analog-to-digital converter module 130 and/or the second digital signal processing module 140 as well as an optional third analog-to-digital converter module, an optional third digital signal processing and/or an optional local oscillator generator module 108 may be formed at a common semiconductor die. Due to a monolithic integration of the apparatus 100 on a single semiconductor die, the costs and/or the space requirement may be reduced.

Figure 2:
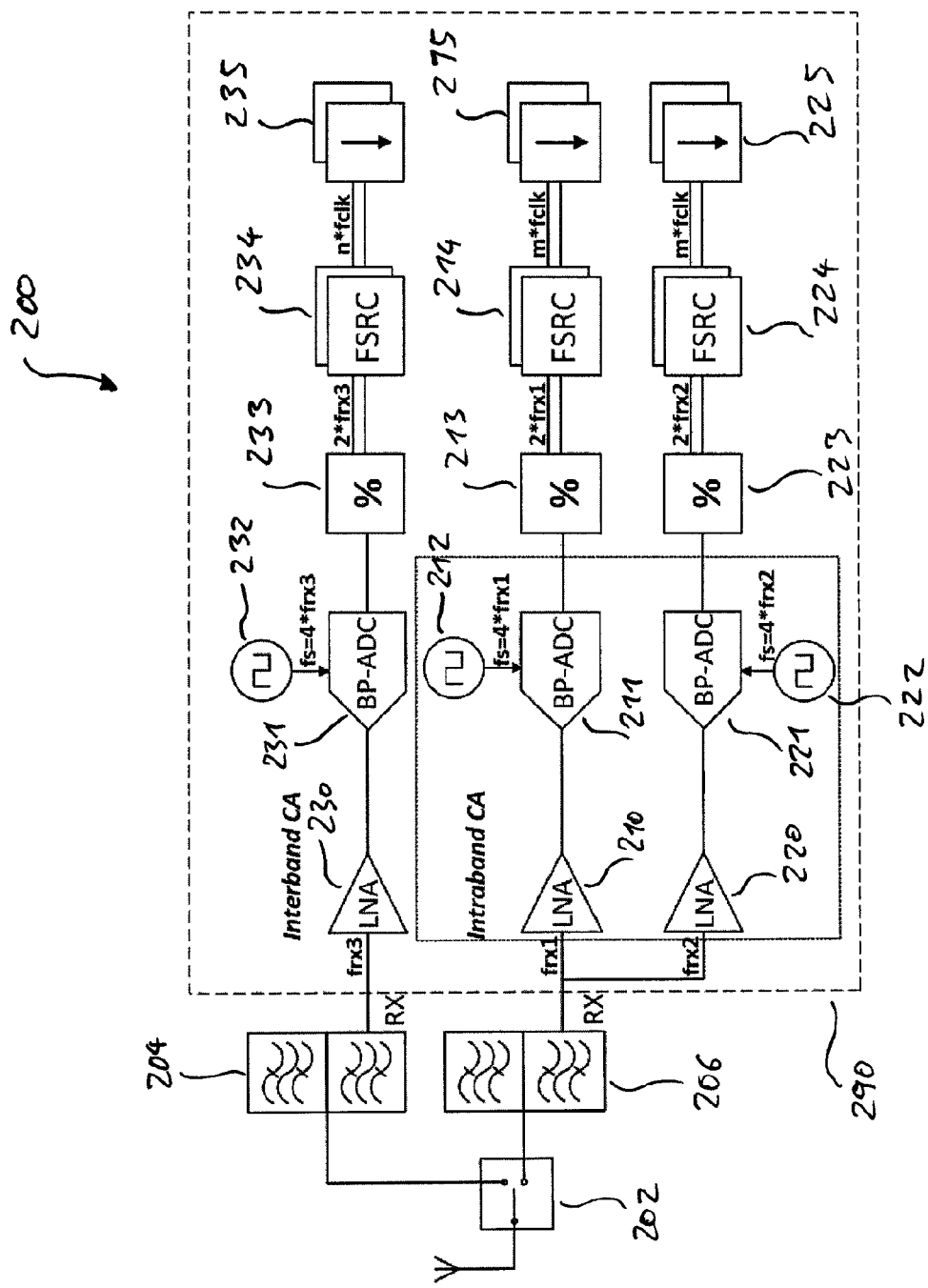
FIG. 2 shows a block diagram of an apparatus for generating base band receive signals by using different sampling frequencies.

FIG. 2 shows a block diagram of an apparatus 200 for generating base band receive signals according to an example. The implementation of the apparatus 200 is similar to the apparatus shown in FIG. 1. The apparatus 200 comprises three receive paths for different receive channels.

The apparatus 200 comprises an antenna module with an antenna switch 202 connected to a duplexer bank comprising at least a first duplexer 206 and a second duplexer 204. The first duplexer 204 provides a first analog receive signal of a first transmission band (with intraband carrier aggregation) to a first low noise amplifier (LNA) 210 of a first receive path and a second low noise amplifier 220 of a second receive path. The second duplexer 204 provides a second analog receive signal of a second transmission band (interband carrier aggregation) to a third low noise amplifier 230 of a third receive path.

The first low noise amplifier 210 outputs a first analog high frequency receive signal to an input of a first analog-to-digital converter module 211. The first analog-to-digital converter module 211 is implemented as a delta sigma ADC representing a bandpass BP ADC. The first analog-to-digital converter module 211 generates a first digital high frequency receive signal by sampling the first analog high frequency receive signal.

Further, a first oscillator signal is provided to the first analog-to-digital converter module 211 by a first oscillator signal generator module 212. For example, the first oscillator signal comprises a frequency fs of four times a first carrier frequency frx1 of a first receive channel containing first payload data to be recovered in the baseband domain (fs=4*frx1).

The first digital sampled high frequency receive signal is provided to a first in-phase-quadrature-phase generator module 213 (complex digital mixer of a first digital signal processing module. The first in-phase-quadrature-phase generator module 213 generates a first in-phase high frequency signal and a first quadrature-phase high frequency signal based on the first digital high frequency receive signal.

Further, the first digital signal processing module comprises a first fractional sampling rate convert (FSRC) module 214 adapting a sample frequency of the first in-phase high frequency signal and the first quadrature-phase high frequency signal to generate a first adapted in-phase high frequency signal and a first adapted quadrature-phase high frequency signal. A sample frequency of the first adapted quadrature-phase high frequency signal and the first adapted quadrature-phase high frequency signal is equal to an integer multiple of a base band frequency, for example.

Additionally, the first digital signal processing module comprises a first digital down mixing and decimation module 215 mixing a frequency range of the first adapted in-phase high frequency signal and the first adapted quadrature-phase high frequency signal containing the first payload data to a frequency range within the baseband frequency range. Further, the first digital down mixing and decimation module 215 reduces a sample frequency of the first adapted quadrature-phase high frequency signal and the first adapted in-phase high frequency signal to obtain the first baseband receive signal (with I/O representation). The sample frequency of the first adapted quadrature-phase high frequency signal and the first adapted in-phase high frequency signal is an integer multiple m of the sample frequency fclk of the first baseband receive signal.

The second low noise amplifier 220 outputs a second analog high frequency receive signal to an input of a second analog-to-digital converter module 221. The second analog-to-digital converter module 221 is implemented as a delta sigma ADC representing a bandpass BP ADC. The second analog-to-digital converter module 221 generates a second digital high frequency receive signal by sampling the second analog high frequency receive signal.

Further, a second oscillator signal is provided to the second analog-to-digital converter module 221 by a first oscillator signal generator module 222. For example, the second oscillator signal comprises a frequency fs of four times a second carrier frequency frx2 of a second receive channel containing second payload data to be recovered in the baseband domain (fs=4*frx2).

The second digital high frequency receive signal is provided to a second in-phase-quadrature-phase generator module 223 of a second digital signal processing module. The second in-phase-quadrature-phase generator module 223 generates a second in-phase high frequency signal and a second quadrature-phase high frequency signal based on the second digital high frequency receive signal.

Further, the second digital signal processing module comprises a second fractional sampling rate convert module 224 adapting a sample frequency of the second in-phase high frequency signal and the second quadrature-phase high frequency signal to generate a second adapted in-phase high frequency signal and a second adapted quadrature-phase high frequency signal. A sample frequency of the second adapted quadrature-phase high frequency signal and the second adapted quadrature-phase high frequency signal is equal to an integer multiple of a base band frequency, for example.

Additionally, the second digital signal processing module comprises a second digital down mixing and decimation module 225 mixing a frequency range of the second adapted in-phase high frequency signal and the second adapted quadrature-phase high frequency signal containing the second payload data to a frequency range within the baseband frequency range. Further, the second digital down mixing and decimation module 225 reduces a sample frequency of the second adapted quadrature-phase high frequency signal and the second adapted in-phase high frequency signal to obtain the second baseband receive signal (with I/O representation). The sample frequency of the second adapted quadrature-phase high frequency signal and the second adapted in-phase high frequency signal is an integer multiple m of the sample frequency fclk of the first baseband receive signal.

The third low noise amplifier 230 outputs a third analog high frequency receive signal to an input of a third analog-to-digital converter module 231. The third analog-to-digital converter module 231 is implemented as a delta sigma ADC representing a bandpass BP ADC. The third analog-to-digital converter module 231 generates a third digital high frequency receive signal by sampling the third analog high frequency receive signal.

Further, a third oscillator signal is provided to the third analog-to-digital converter module 231 by a third oscillator signal generator module 232. For example, the third oscillator signal comprises a frequency fs of four times a third carrier frequency frx3 of a third receive channel containing third payload data to be recovered in the baseband domain (fs=4*frx3).

The third digital high frequency receive signal is provided to a third in-phase-quadrature-phase generator module 233 of a third digital signal processing module. The third in-phase-quadrature-phase generator module 233 generates a third in-phase high frequency signal and a third quadrature-phase high frequency signal based on the third digital high frequency receive signal.

Further, the third digital signal processing module comprises a third fractional sampling rate convert module 234 adapting a sample frequency of the third in-phase high frequency signal and the third quadrature-phase high frequency signal to generate a third adapted in-phase high frequency signal and a third adapted quadrature-phase high frequency signal. A sample frequency of the third adapted quadrature-phase high frequency signal and the third adapted quadrature-phase high frequency signal is equal to an integer multiple of a base band frequency, for example.

Additionally, the third digital signal processing module comprises a third digital down mixing and decimation module 235 mixing a frequency range of the third adapted in-phase high frequency signal and the third adapted quadrature-phase high frequency signal containing the third payload data to a frequency range within the baseband frequency range. Further, the third digital down mixing and decimation module 235 reduces a sample frequency of the third adapted quadrature-phase high frequency signal and the third adapted in-phase high frequency signal to obtain the third baseband receive signal (with I/Q representation). The sample frequency of the third adapted quadrature-phase high frequency signal and the third adapted in-phase high frequency signal is an integer multiple n of the sample frequency fclk of the first baseband receive signal.

The apparatus may comprise more than three receive paths for more than three carrier receive signals. The concept may be extended to an arbitrary number of carriers.

Optionally, the dashed rectangle in FIG. 2 indicates components of the apparatus 200 formed on a common chip 290.

FIG. 2 may show an example of a multi carrier direct sampling RX (receiver) architecture.

More details and aspects of the apparatus 200 are mentioned in connection with the proposed concept or one or more examples described above (e.g. FIG. 1). The apparatus 200 may comprise one or more additional optional features corresponding to one or more aspects of the proposed concept or one or more examples described above or below.

Figure 3:
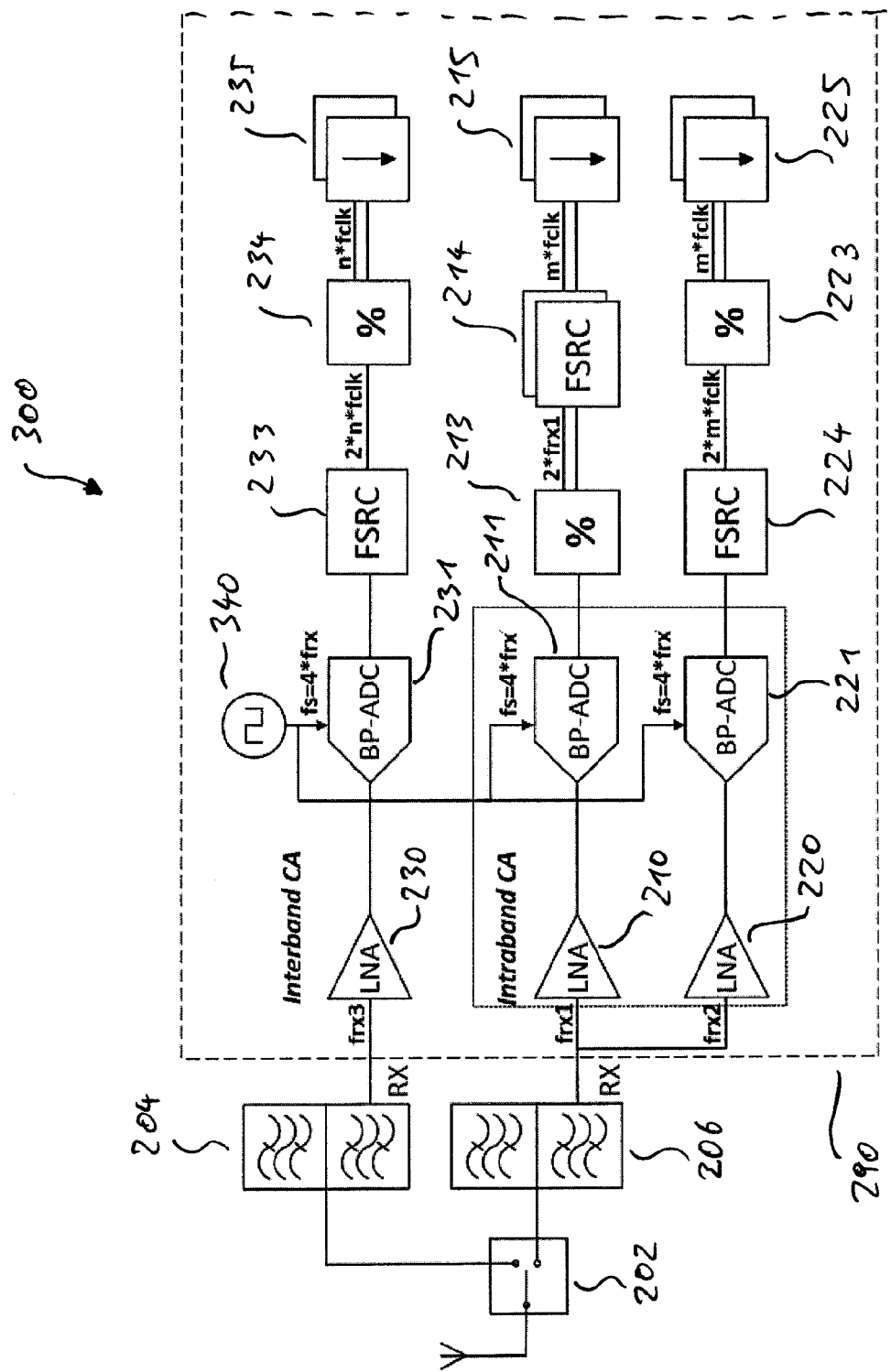
FIG. 3 shows a block diagram of an apparatus for generating base band receive signals by using equal or integer multiple sampling frequencies.

FIG. 3 shows a block diagram of an apparatus 300 for generating base band receive signals according to an example. The implementation of the apparatus 300 is similar to the apparatus shown in FIG. 2. However, a single local oscillator generator module 340 provides the same oscillator signal to the analog-to-digital converter modules of all receive paths so that all analog high frequency receive signals are sampled with the same sampling frequency. Further, the order of the second in-phase-quadrature-phase generator module 223 and the second fractional sampling rate convert module 224 as well as the third in-phase-quadrature-phase generator module 233 and the third fractional sampling rate convert module 234 are swapped, since the sampling frequency fs is not an integer multiple of the second carrier signal of the second receive channel and of the third carrier signal of the third receive channel.

In the example shown in FIG. 3, the first carrier frequency frx1 is the highest carrier frequency of a receive channel processed by the apparatus 300. In other words, the first carrier frequency frx1 is higher than or equal to the second carrier frequency frx2 and the second carrier frequency frx3. Further, the analog-to-digital converter modules of the apparatus 300 sample the analog high frequency receive signals with a sampling frequency fs being equal to four times a reference receive frequency frx being equal to or higher than the highest carrier frequency of a receive channel processed by the apparatus 300 (frx≥{frx1, frx2, frx3}).

FIG. 3 may show an example of a multi carrier direct single sampling RX (receiver) architecture.

The proposed apparatus 300 may sample directly multiple receiving signal channels from arbitrary different carriers, in the same or different bands, with solely single sampling rate without major performance degradation. The proposed approach may assume to apply a convenient high enough sampling rate—higher or equal to the highest carrier frequency—as the fundamental sampling rate for all receiving carriers (e.g. FIG. 3). For instance assuming the frx1 is the carrier with highest frequency in FIG. 3, the receiver may operate with one synthesizer at any frequency higher or equal to 4/M*frx1 (M is the subsampling rate respectively). Using a sampling rate equal to 4/M*frx1 may keep the RX1 chain unchanged and similar to single carrier mode for that receiver chain, where the complex down-modulation of carrier may reduce and simplify to a dedicated interleaving (technically multiplexing) of sampled bits to I and Q data at half data rate. To prepare the data effectively for decimation and the final digital down mixing to the baseband, a subsequent fractional sampling rate converter (FSRC) may be employed to convert I and Q data rates to integer form of system clock rate. Other carriers at lower input frequencies, like frx2 or frx3 in FIG. 3, may then be oversampled with the 4/M*frx1 sampling rate or with any other integer ratio (N) of fundamental sampling rate, e.g. 4/M/N*frx1, if it is still 4× higher than input carrier frequency. In the case of remaining carriers with a sampling rate not fitting exactly to 4× received carrier frequency, a subsequent application of FSRC may resample them almost degradation-free to the convenient sampling rate for simplified digital complex down mixing. Hence, afterward a multiplexing based I/Q down-mixing can be applied similar to the first basic carrier at frx1 (e.g. FIG. 3), for example.

For example, if the first carrier frequency frx1 is equal to 900 MHz and the sub sampling factor M is equal to 3, the sampling rate of the ADC is 4/3*900 MHz=1.2 GHz. For an LTE20 channel, the bandwidth of the receive channel would be 20 MHz. In this case, the oversampling rate of the delta sigma ADC with respect to the bandwidth of the receive channel would still be 30.

The analog-to-digital converters may be oversampling ADCs with a channel programmable band-pass characteristic (e.g. band-pass sigma delta ADCs). Their Band-pass noise shaper with a coarse quantizer may make sure a very power efficient and high resolution selective sampling of each interested carrier at dedicated channels. This may dodge a sampling of entire bands by avoiding sampling of unnecessary data, for example.

More details and aspects of the apparatus 300 are mentioned in connection with the proposed concept or one or more examples described above (e.g. FIG. 2). The apparatus 300 may comprise one or more additional optional features corresponding to one or more aspects of the proposed concept or one or more examples described above or below.

Figure 4:
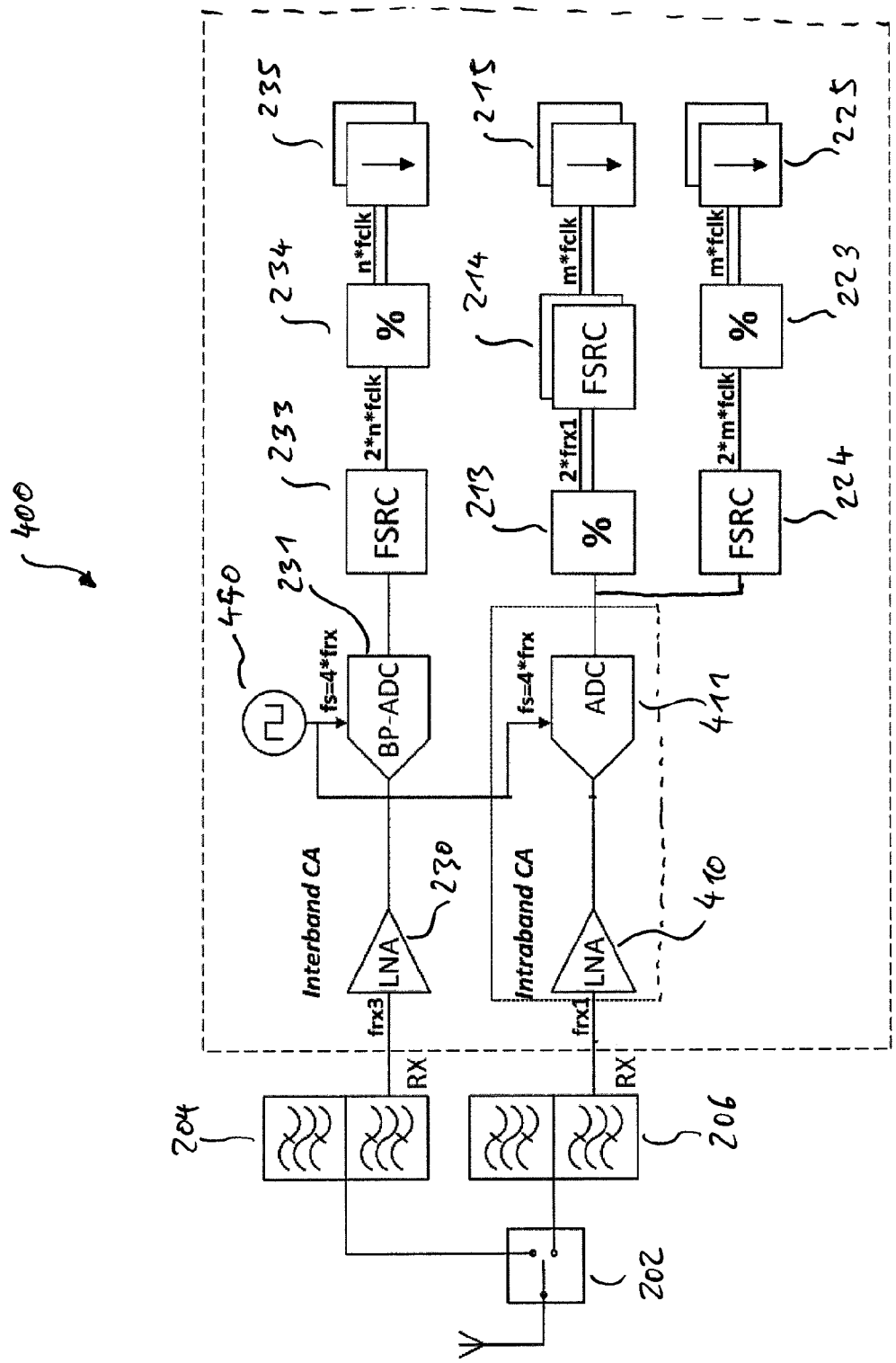
FIG. 4 shows a block diagram of an apparatus for generating base band receive signals as in FIG. 3 but using a single analog-to-digital converter for intraband carrier aggregation.

FIG. 4 shows a block diagram of an apparatus 400 for generating base band receive signals according to an example. The implementation of the apparatus 400 is similar to the apparatus shown in FIG. 3. However, the first receive path and the second receive path comprise a common low noise amplifier 410 and a common analog-to-digital converter module 411. For example, the common analog-to-digital converter module 411 comprises a delta sigma analog-to-digital converter with a loop filter comprising a pass band, which covers the first receive channel and the second receive channel.

More details and aspects of the apparatus 400 are mentioned in connection with the proposed concept or one or more examples described above (e.g. FIG. 3). The apparatus 400 may comprise one or more additional optional features corresponding to one or more aspects of the proposed concept or one or more examples described above or below.

Figure 5:
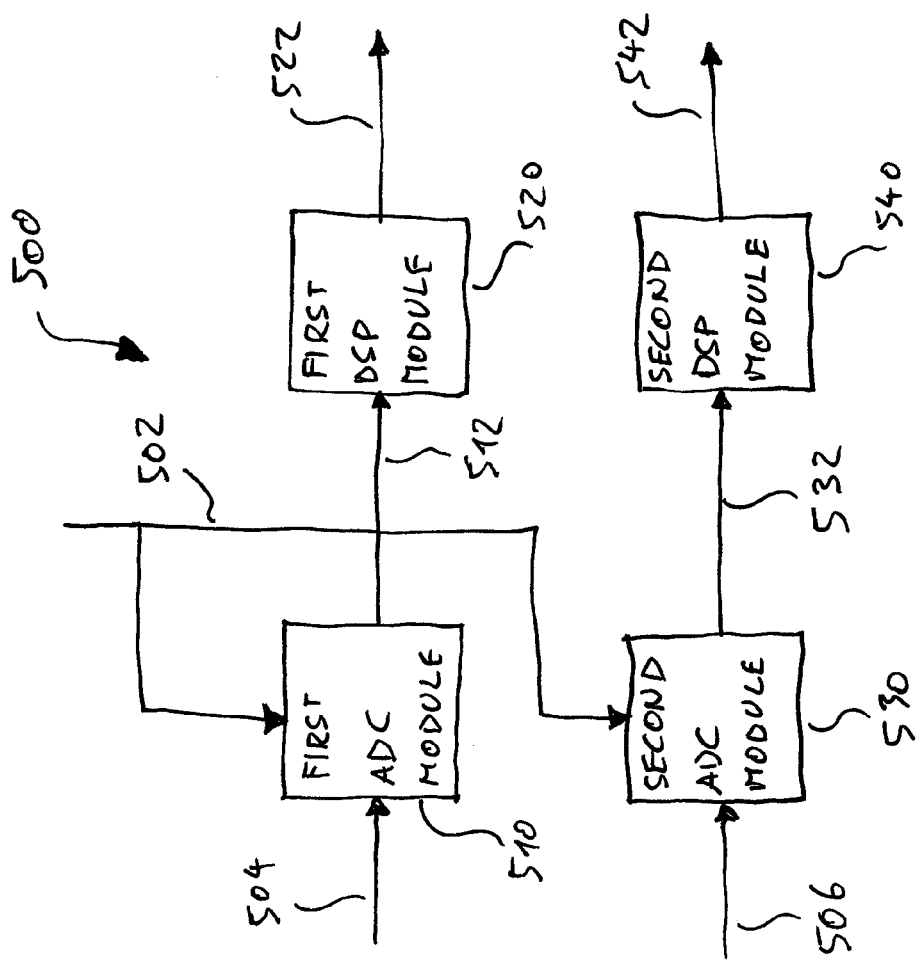
FIG. 5 shows a block diagram of an apparatus for generating base band receive signals by using equal or integer multiple sampling frequencies.

FIG. 5 shows a block diagram of an apparatus 500 for generating base band receive signals according to an example. The apparatus 500 comprises a first analog-to-digital converter module 510, a first digital signal processing module 520, a second analog-to-digital converter module 530 and a second digital signal processing module 540. The first analog-to-digital converter module 510 generates a first digital high frequency receive signal 512 at least by sampling a first analog high frequency receive signal 504 with a first sampling frequency. Further, the first digital signal processing module 520 generates a first base band receive signal 522 based on the first digital high frequency receive signal 512. The second analog-to-digital converter module 530 generates a second digital high frequency receive signal 532 at least by sampling a second analog high frequency receive signal 506 with the second sampling frequency. The second sampling frequency is equal to the first sampling frequency or equal to the first sampling frequency divided by an integer. Further, the second digital signal processing module 540 generates a second base band receive signal 542 based on the second digital high frequency receive signal 532.

By the introduction of a multi-carrier direct RF (radio frequency) sampling, for example, a very power efficient solution for CA (carrier aggregation) systems may be provided. A channel selective digital down-conversion may save plenty power and may relax the required dynamic range for the ADC (analog-to-digital converter), for example. The extremely high power efficiency may make a direct sampling of input RF signal feasible and may obsolete the need for any analog IF (intermediate frequency) mixer. With its single clock/synthesizer it may significantly avoid all common spurs issues of conventional multi-carriers multi-LO approaches, for example. Further the proposed apparatus may obviate most known low frequency specific impairments in zero-IF receivers such as flicker noise or second order intermodulation products due to TX (transmitter), for example.

More details and aspects of the apparatus 500 (e.g. regarding analog-to-digital converter module, digital signal processing module, analog high frequency receive signal, digital high frequency receive signal, base band receive signal, sampling frequency) are mentioned in connection with the proposed concept or one or more examples described above (e.g. FIG. 1 or 3). The apparatus 500 may comprise one or more additional optional features corresponding to one or more aspects of the proposed concept or one or more examples described above or below.

Figure 6:
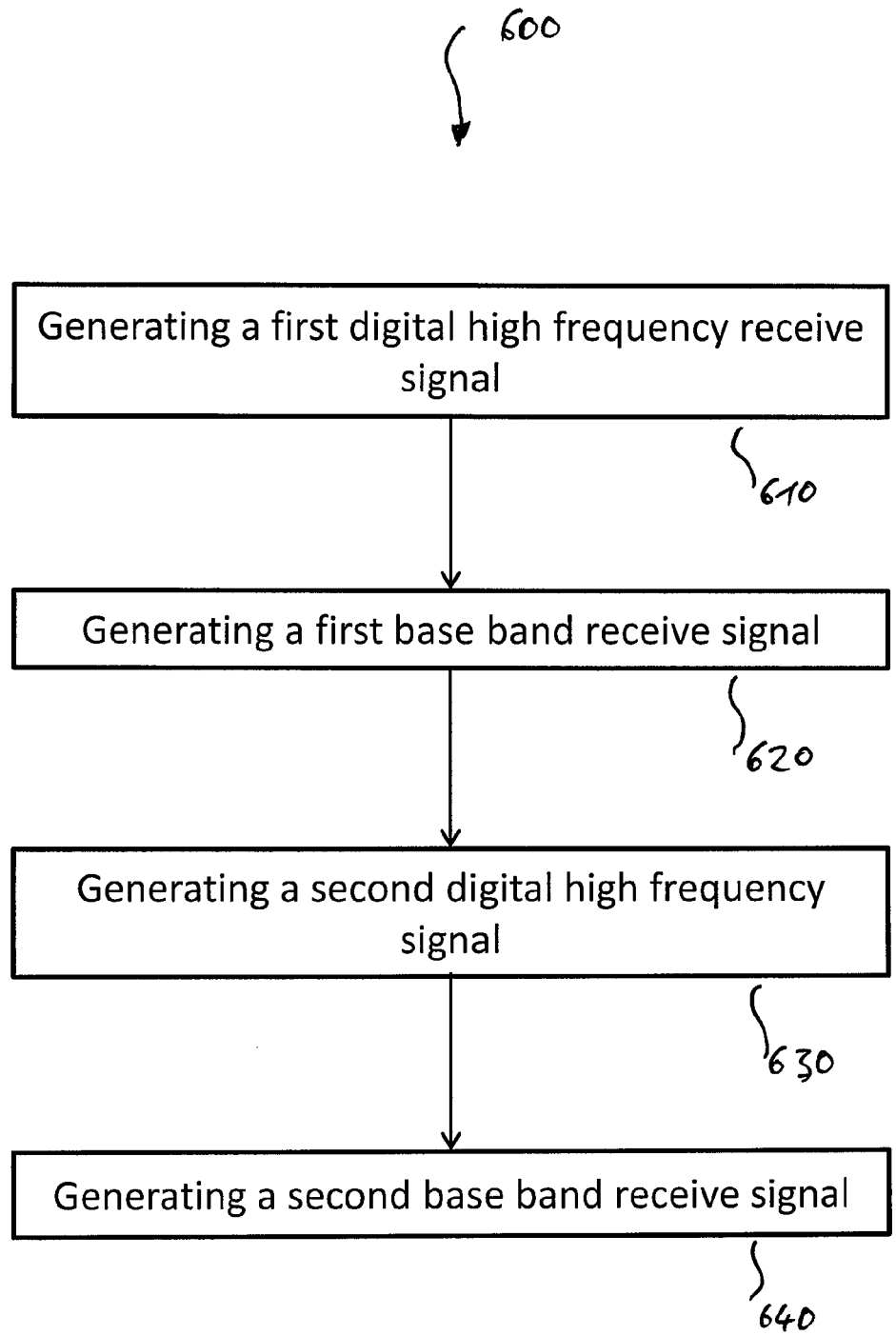
FIG. 6 is a flow chart of a method for generating base band receive signals.

FIG. 6 shows a flow chart of a method 600 for generating base band receive signals according to an example. The method 600 comprises generating 610 a first digital high frequency receive signal at least by sampling a first analog high frequency receive signal. The first analog high frequency receive signal contains first payload data at a first receive channel associated with a first carrier frequency. Further, the method 600 comprises generating 620 a first base band receive signal based on the first digital high frequency receive signal and generating 630 a second digital high frequency receive signal at least by sampling a second analog high frequency receive signal. The second analog high frequency receive signal contains second payload data at a second receive channel associated with a second carrier frequency, wherein the first carrier frequency differs from the second carrier frequency. Additionally, the method 600 comprises generating 640 a second base band receive signal based on the second digital high frequency receive signal.

By the introduction of a multi-carrier direct RF (radio frequency) sampling, for example, a very power efficient solution for CA (carrier aggregation) systems may be provided.

The method 600 may comprise one or more additional optional features corresponding to one or more aspects of the proposed concept or one or more examples described above.

Figure 7:
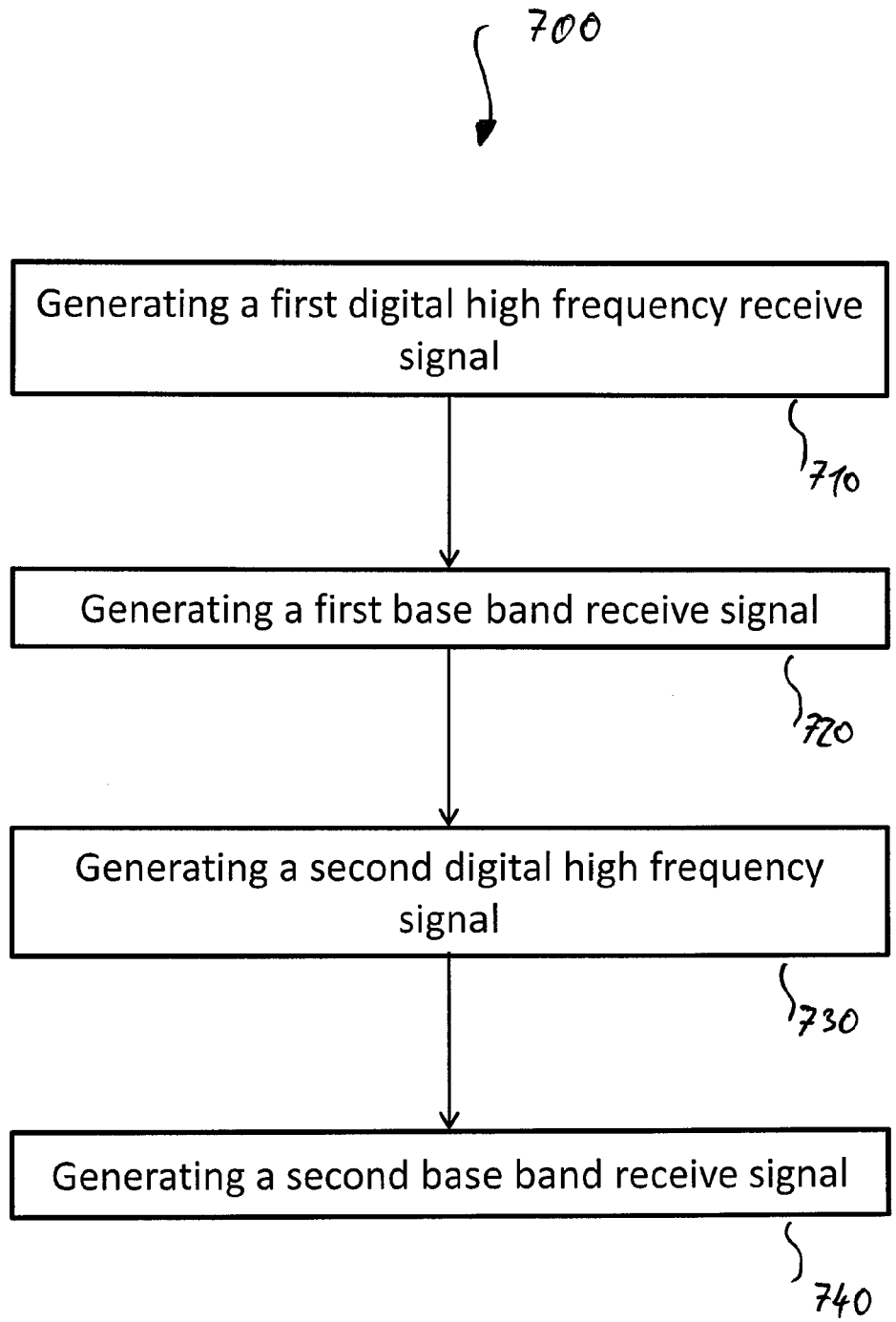
FIG. 7 is a flow chart of a method for generating base band receive signals by using equal sampling frequencies.

FIG. 7 shows a flow chart of a method 700 for generating base band receive signals according to an example. The method 700 comprises generating 710 a first digital high frequency receive signal at least by sampling a first analog high frequency receive signal with a first sampling frequency and generating 720 a first base band receive signal based on the first digital high frequency receive signal. Further, the method 700 comprises generating 730 a second digital high frequency receive signal at least by sampling a second analog high frequency receive signal with the second sampling frequency. The second sampling frequency is equal to the first sampling frequency or equal to the first sampling frequency divided by an integer. Additionally, the method 700 comprises generating 740 a second base band receive signal based on the second digital high frequency receive signal.

By the introduction of a multi-carrier direct RF (radio frequency) sampling, for example, a very power efficient solution for CA (carrier aggregation) systems may be provided.

The method 700 may comprise one or more additional optional features corresponding to one or more aspects of the proposed concept or one or more examples described above.

Figure 8:
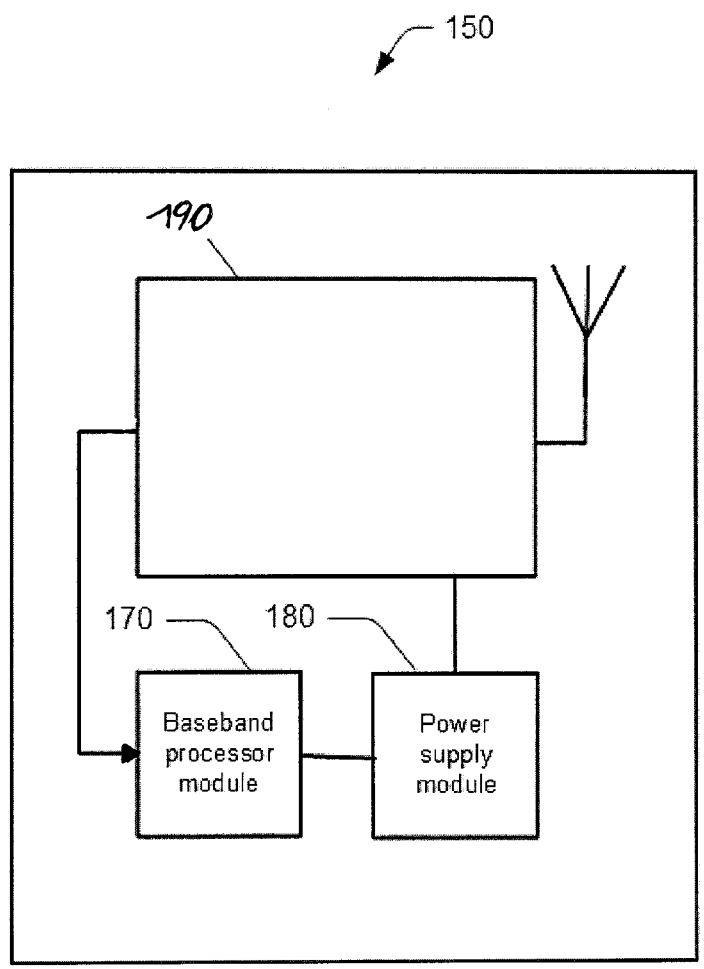
FIG. 8 shows a block diagram of a mobile device.

FIG. 8 shows a schematic illustration of a mobile device 150. The mobile device comprises an apparatus 100, 200, 300, 400, 500 (e.g. FIG. 1-5) for generating baseband receive signals within a receiver or a transceiver 190. Further, the mobile device 150 comprises a baseband processor module 170 for further processing the baseband receive signals. Additionally, the mobile device 150 comprises a power supply unit 180 supplying at least the receiver or the transceiver 190 and the baseband processor module 170 with power.

In some examples, a cell phone may comprise a receiver or a transceiver comprising an apparatus for generating baseband signals according to the proposed concept or one or more examples described above.

Further, some examples relate to a base station or a relay station of a mobile communication system comprising a receiver or a transceiver with an apparatus for generating baseband signals according to the described concept or one or more examples described above.

Some examples relate to a highly digital multi-carrier RF receiver architecture with single clock. According to an aspect, a multi-carrier fully digital RX architecture by sampling the received multiple input signals at any arbitrary frequencies with single clock/synthesizer followed by a dedicated digital signal processing is introduced.

In comparison, in a direct-conversion RX architecture for user equipment (UE) each carrier may be assumed to be down-mixed into the baseband by the corresponding local frequency (LO). Therefore, the receiver may employ as many LO synthesizer as the number of simultaneously supported carriers.

This may increase the current consumption several times since all LO synthesizers and the LO distribution path run in very high frequency with very low far-out phase noise requirement. Additionally cross talk between different receiver chains, especially between LO signals, may deteriorate the reception and system performance immensely forcing higher isolation requirement for each synthesizer.

All those may make the design of receiver very unpredictable and cumbersome with a long in-lab optimization and development time.

On the other hand at the Base Transceiver Station (BTS) side the situation for intraband CA may be relaxed since they may apply a digital sampling of the whole band at a suitable intermediate frequency after dedicated antialiasing filtering. In this case the entire band is digital-sampled at once by a highly linear and power intensive Nyquist ADC. The channel selections and further down-conversion are accomplished in digital domain. This approach requires a very broadband Nyquist ADC with an extremely high dynamic range. Such kind of ADCs may be manufactured in special process technology working with higher supply voltage consuming several Watt power and still they need an analog mixer and dedicated antialiasing filter to convert the input signal to desired intermediated frequency.

This concept may be inapplicable to receivers for UE and handheld devices due to extensive high dynamic range requirement, the extreme power consumption and tough design of Anti-aliasing filter.

According to a proposed aspect, a full digital multi-carrier receiver is provided especially suited for UE and low power applications by directly digital-sampling the RF input with solely single dedicated clock frequency. All further signal processing and down-conversion into inphase/quadrature (I/Q) and channel filtering may be ultimately accomplished in digital domain after the analog to digital conversion.

The proposed concept may enable the most digital receiver (process compatible with most advanced digital deep-submicron technology) capable to support simultaneously many carriers as desired with the lowest cross-talk concerns and preeminent low current consumption/area requirement, for example.

Some aspects of the proposed concept may relate to carrier aggregation, digital I/O, multi-carrier and/or software defined radio (SDR) and/or a cellular or connectivity transceiver.

A proposed apparatus may be implemented in high volume architectures or other than high volume architectures and/or may encompass test systems and design/debug tools, for example.

In the following examples pertain to further examples. Example 1 is an apparatus for generating base band receive signals comprising a first analog-to-digital converter module configured to generate a first digital high frequency receive signal at least by sampling a first analog high frequency receive signal, wherein the first analog high frequency receive signal contains first payload data at a first receive channel associated with a first carrier frequency, a first digital signal processing module configured to generate a first base band receive signal based on the first digital high frequency receive signal, a second analog-to-digital converter module configured to generate a second digital high frequency receive signal at least by sampling a second analog high frequency receive signal, wherein the second analog high frequency receive signal contains second payload data at a second receive channel associated with a second carrier frequency, wherein the first carrier frequency differs from the second carrier frequency, and a second digital signal processing module configured to generate a second base band receive signal based on the second digital high frequency receive signal.

In example 2, the subject matter of example 1 can optionally include the first analog-to-digital converter module configured to sample the first analog high frequency receive signal with a first sampling frequency of more than 4 times a band width of the first receive channel.

In example 3, the subject matter of example 2 can optionally include the first sampling rate being larger than $4/M * f_{max,rx}$, wherein $f_{max,rx}$ is the highest carrier frequency of a receive channel with payload data to be converted to the base band domain, wherein M is an integer lower than 10.

In example 4, the subject matter of any one of examples 2-3 can optionally include the second analog-to-digital converter module configured to sample the second analog high frequency receive signal with a second sampling frequency being equal to the first sampling frequency or equal to the first sampling frequency divided by an integer.

In example 5, the subject matter of any one of examples 1-4 can optionally include the first receive channel and the second receive channel being located within the same transmission band.

In example 6, the subject matter of any one of examples 1-5 can optionally include a local oscillator generator module configured to provide a first local oscillator signal with a first oscillator signal frequency to the first analog-to-digital converter module and the second analog-to-digital converter module.

In example 7, the subject matter of any one of examples 1-6 can optionally include comprising a local oscillator generator module configured to provide a first local oscillator signal with a first oscillator signal frequency to the first analog-to-digital converter module and a second local oscillator with a second oscillator signal frequency to the second analog-to-digital converter module, wherein the first oscillator signal frequency is an integer multiple of the second oscillator signal frequency.

In example 8, the subject matter of any one of examples 1-7 can optionally include the first base band receive signal containing the first payload data and the second base band receive signal contains the second payload data.

In example 9, the subject matter of any one of examples 1-8 can optionally include the first analog high frequency receive signal and the second analog high frequency receive signal being derived from the same receive signal.

In example 10, the subject matter of any one of examples 1-9 can optionally include a third analog-to-digital converter module configured to generate a third digital high frequency receive signal at least by sampling a third analog high frequency receive signal, wherein the third analog high frequency receive signal contains third payload data at a third receive channel associated with a third carrier frequency, wherein the third carrier frequency differs from the first carrier frequency and the second carrier frequency, and a third digital signal processing module configured to generate a third base band receive signal based on the third digital high frequency receive signal.

In example 11, the subject matter of one of the previous examples can optionally include the first analog-to-digital converter module comprising a first delta sigma analog-to-digital converter and the second analog-to-digital converter module comprises a second delta sigma analog-to-digital converter.

In example 12, the subject matter of one of the previous examples can optionally include a filter characteristic of the first delta sigma analog-to-digital converter differing from a filter characteristic of the second delta sigma analog-to-digital converter.

In example 13, the subject matter of any of the previous examples can optionally include a pass band of a loop filter of the first delta sigma analog-to-digital converter differing from a pass band of a loop filter of the second delta sigma analog-to-digital converter.

In example 14, the subject matter of example 13 can optionally including the first carrier frequency is located within the pass band of the loop filter of the first delta sigma analog-to-digital converter and the second carrier frequency is located within the pass band of the loop filter of the second delta sigma analog-to-digital converter.

In example 15, the subject matter of any one of examples 1-14 can optionally include the first digital signal processing module comprising a first in-phase-quadrature-phase generator module configured to generate a first in-phase high frequency signal and a first quadrature-phase high frequency signal based on the first digital high frequency receive signal.

In example 16, the subject matter of example 15 can optionally include the first digital signal processing module comprising a first fractional sampling rate convert module configured to adapt a sample frequency of the first in-phase high frequency signal and the first quadrature-phase high frequency signal to generate a first adapted in-phase high frequency signal and a first adapted quadrature-phase high frequency signal, wherein a sample frequency of the first adapted quadrature-phase high frequency signal and the second adapted quadrature-phase high frequency signal is equal to an integer multiple of a base band frequency.

In example 17, the subject matter of any one of examples 1-16 can optionally include the second digital signal processing module comprising a second fractional sampling rate convert module configured to adapt a sample frequency of the second digital high frequency receive signal to generate a second adapted digital high frequency receive signal, wherein a sample frequency of the second adapted digital high frequency receive signal is equal to an integer multiple of a base band frequency.

In example 18, the subject matter of example 17 can optionally include the second digital signal processing module comprising a second in-phase-quadrature-phase generator module configured to generate a second in-phase high frequency signal and a second quadrature-phase high frequency signal based on the second adapted digital high frequency receive signal.

In example 19, the subject matter of any one of examples 1-18 can optionally include the first analog-to-digital converter module, the first digital signal processing module, the second analog-to-digital converter module and the second digital signal processing module being formed at a common semiconductor die.

Example 20 is an apparatus for generating base band receive signals comprising means for generating a first digital high frequency receive signal configured to generate a first digital high frequency receive signal at least by sampling a first analog high frequency receive signal, wherein the first analog high frequency receive signal contains first payload data at a first receive channel associated with a first carrier frequency, means for generating a first base band receive signal configured to generate a first base band receive signal based on the first digital high frequency receive signal, means for generating a second digital high frequency receive signal configured to generate a second digital high frequency receive signal at least by sampling a second analog high frequency receive signal, wherein the second analog high frequency receive signal contains second payload data at a second receive channel associated with a second carrier frequency, wherein the first carrier frequency differs from the second carrier frequency and means for generating a second base band receive signal configured to generate a second base band receive signal based on the second digital high frequency receive signal.

In example 21, the subject matter of example 20 can optionally include the first sampling rate being larger than $4/M*f_{max,rx}$, wherein $f_{max,rx}$ is the highest carrier frequency of a receive channel with payload data to be converted to the base band domain, wherein M is an integer lower than 10.

Example 22 is an apparatus for generating base band receive signals comprising a first analog-to-digital converter module configured to generate a first digital high frequency receive signal at least by sampling a first analog high frequency receive signal with a first sampling frequency, a first digital signal processing module configured to generate a first base band receive signal based on the first digital high frequency receive signal, a second analog-to-digital converter module configured to generate a second digital high frequency receive signal at least by sampling a second analog high frequency receive signal with the second sampling frequency, wherein the second sampling frequency is equal to the first sampling frequency or equal to the first sampling frequency divided by an integer and a second digital signal processing module configured to generate a second base band receive signal based on the second digital high frequency receive signal.

In example 23, the subject matter of example 22 can optionally include the first analog-to-digital converter module configured to sample the first analog high frequency receive signal with a first sampling frequency of more than 4 times a band width of the first receive channel.

In example 24, the subject matter of example 23 can optionally include the first sampling rate being larger than $4/M*f_{max,rx}$, wherein $f_{max,rx}$ is the highest carrier frequency of a receive channel with payload data to be converted to the base band domain, wherein M is an integer lower than 10.

Example 25 is a receiver or a transceiver comprising an apparatus according the subject matter of any of the previous examples.

Example 26 is a mobile device comprising a receiver or a transceiver according to example 25.

Example 27 is a cell phone comprising a receiver or a transceiver according to example 25.

Example 28 is a method for generating base band receive signals comprising generating a first digital high frequency receive signal at least by sampling a first analog high frequency receive signal, wherein the first analog high frequency receive signal contains first payload data at a first receive channel associated with a first carrier frequency, generating a first base band receive signal based on the first digital high frequency receive signal, generating a second digital high frequency receive signal at least by sampling a second analog high frequency receive signal, wherein the second analog high frequency receive signal contains second payload data at a second receive channel associated with a second carrier frequency, wherein the first carrier frequency differs from the second carrier frequency, and generating a second base band receive signal based on the second digital high frequency receive signal.

In example 29, the subject matter of example 28 can optionally include sampling the first analog high frequency receive signal is done with a first sampling frequency of more than 4 times a band width of the first receive channel.

In example 30, the subject matter of example 29 can optionally include the first sampling rate being larger than $4/M\text{-}f_{max,rx}$, wherein $f_{max,rx}$ is the highest carrier frequency of a receive channel with payload data to be converted to the base band domain, wherein M is an integer lower than 10.

In example 31, the subject matter of one of the examples 28 to 30 can optionally include the sampling the second analog high frequency receive signal being done with a second sampling frequency being equal to the first sampling frequency or equal to the first sampling frequency divided by an integer.

In example 32, the subject matter of one of the examples 28 to 31 can optionally include the first receive channel and the second receive channel being located within the same transmission band.

In example 33, the subject matter of one of the examples 28 to 32 can optionally include generating a first in-phase high frequency signal and a first quadrature-phase high frequency signal based on the first digital high frequency receive signal.

In example 34, the subject matter of example 33 can optionally include adapting a sample frequency of the first in-phase high frequency signal and the first quadrature-phase high frequency signal to generate a first adapted in-phase high frequency signal and a second adapted quadrature-phase high frequency signal, wherein a sample frequency of the first adapted quadrature-phase high frequency signal and the second adapted quadrature-phase high frequency signal are equal to an integer multiple of a base band frequency.

In example 35, the subject matter of one of the examples 28 to 34 can optionally include adapting a sample frequency of the second digital high frequency receive signal to generate a second adapted digital high frequency receive signal, wherein the sampling frequency of the second digital high frequency receive signal is equal to an integer multiple of a base band frequency.

In example 36, the subject matter of example 35 can optionally include generating a second in-phase high frequency signal and a second quadrature-phase high frequency signal based on the second adapted digital high frequency receive signal.

Example 37 is a method for generating base band receive signals comprising generating a first digital high frequency receive signal at least by sampling a first analog high frequency receive signal with a first sampling frequency, generating a first base band receive signal based on the first digital high frequency receive signal, generating a second digital high frequency receive signal at least by sampling a second analog high frequency receive signal with the second sampling frequency, wherein the second sampling frequency is equal to the first sampling frequency or equal to the first sampling frequency divided by an integer, and generating a second base band receive signal based on the second digital high frequency receive signal.

In example 38, the subject matter of example 37 can optionally include sampling the first analog high frequency receive signal is done with a first sampling frequency of more than 4 times a band width of the first receive channel.

In example 39, the subject matter of example 38 can optionally include the first sampling rate being larger than $4/M*f_{max,rx}$, wherein $f_{max,rx}$ is the highest carrier frequency of a receive channel with payload data to be converted to the base band domain, wherein M is an integer lower than 10.

Example 40 is a machine readable storage medium including program code, when executed, to cause a machine to perform the method of one of the examples 28 to 39.

Example 41 is a machine readable storage including machine readable instructions, when executed, to implement a method or realize an apparatus as implemented by any one of examples 1-39.

Example 42 is a computer program having a program code for performing the method of one of the examples 28 to 39, when the computer program is executed on a computer or processor.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

The invention claimed is:

1. An apparatus for generating base band receive signals comprising:
    a first analog-to-digital converter module configured to generate a first digital high frequency receive signal at least by sampling a first analog high frequency receive signal, wherein the first analog high frequency receive signal comprises first payload data at a first receive channel associated with a first carrier frequency;
    a first digital signal processing module configured to generate a first base band receive signal based on the first digital high frequency receive signal;
    a second analog-to-digital converter module configured to generate a second digital high frequency receive signal at least by sampling a second analog high frequency receive signal, wherein the second analog high frequency receive signal comprises second payload data at a second receive channel associated with a second carrier frequency, wherein the first carrier frequency differs from the second carrier frequency; and
    a second digital signal processing module configured to generate a second base band receive signal based on the second digital high frequency receive signal.

2. The apparatus according to claim 1, wherein the first analog-to-digital converter module is configured to sample the first analog high frequency receive signal with a first sampling frequency of more than about four times a band width of the first receive channel.

3. The apparatus according to claim 2, wherein the first sampling rate is larger than $4/M*f_{max,rx}$, wherein $f_{max,rx}$ is the highest carrier frequency of a receive channel with payload data to be converted to the base band domain, wherein M is an integer lower than ten.

4. The apparatus according to claim 2, wherein the second analog-to-digital converter module is configured to sample the second analog high frequency receive signal with a second sampling frequency being equal to the first sampling frequency or equal to the first sampling frequency divided by an integer.

5. The apparatus according to claim 1, wherein the first receive channel and the second receive channel are located within the same transmission band.

6. The apparatus according to claim 1, comprising a local oscillator generator module configured to provide a first local oscillator signal with a first oscillator signal frequency to the first analog-to-digital converter module and the second analog-to-digital converter module.

7. The apparatus according to claim 1, comprising a local oscillator generator module configured to provide a first local oscillator signal with a first oscillator signal frequency to the first analog-to-digital converter module and a second local oscillator signal with a second oscillator signal frequency to the second analog-to-digital converter module, wherein the first oscillator signal frequency is an integer multiple of the second oscillator signal frequency.

8. The apparatus according to claim 1, wherein the first base band receive signal comprises the first payload data and the second base band receive signal comprises the second payload data.

9. The apparatus according to claim 1, wherein the first analog high frequency receive signal and the second analog high frequency receive signal are derived from the same receive signal.

10. The apparatus according to claim 1, further comprising:
    a third analog-to-digital converter module configured to generate a third digital high frequency receive signal at least by sampling a third analog high frequency receive signal, wherein the third analog high frequency receive signal comprises third payload data at a third receive channel associated with a third carrier frequency, wherein the third carrier frequency differs from the first carrier frequency and the second carrier frequency; and
    a third digital signal processing module configured to generate a third base band receive signal based on the third digital high frequency receive signal.

11. The apparatus according to claim 1, wherein the first analog-to-digital converter module comprises a first delta sigma analog-to-digital converter and the second analog-to-digital converter module comprises a second delta sigma analog-to-digital converter.

12. The apparatus according to claim 11, wherein a filter characteristic of the first delta sigma analog-to-digital converter differs from a filter characteristic of the second delta sigma analog-to-digital converter.

13. The apparatus according to claim 11, wherein a pass band of a loop filter of the first delta sigma analog-to-digital converter differs from a pass band of a loop filter of the second delta sigma analog-to-digital converter.

14. The apparatus according to claim 13, wherein the first carrier frequency is located within the pass band of the loop filter of the first delta sigma analog-to-digital converter and the second carrier frequency is located within the pass band of the loop filter of the second delta sigma analog-to-digital converter.

15. The apparatus according to claim 1, wherein the first digital signal processing module comprises a first in-phase-quadrature-phase generator module configured to generate a first in-phase high frequency signal and a first quadrature-phase high frequency signal based on the first digital high frequency receive signal.

16. The apparatus according to claim 15, wherein the first digital signal processing module comprises a first fractional sampling rate convert module configured to adapt a sample frequency of the first in-phase high frequency signal and the first quadrature-phase high frequency signal to generate a first adapted in-phase high frequency signal and a first adapted quadrature-phase high frequency signal, wherein a sample frequency of the first adapted quadrature-phase high frequency signal and the second adapted quadrature-phase high frequency signal is equal to an integer multiple of a base band frequency.

17. The apparatus according to claim 1, wherein the second digital signal processing module comprises a second fractional sampling rate convert module configured to adapt a sample frequency of the second digital high frequency receive signal to generate a second adapted digital high frequency receive signal, wherein a sample frequency of the second adapted digital high frequency receive signal is equal to an integer multiple of a base band frequency.

18. The apparatus according to claim 17, wherein the second digital signal processing module comprises a second in-phase-quadrature-phase generator module configured to generate a second in-phase high frequency signal and a second quadrature-phase high frequency signal based on the second adapted digital high frequency receive signal.

19. An apparatus for generating base band receive signals comprising:
a first analog-to-digital converter module configured to generate a first digital high frequency receive signal at least by sampling a first analog high frequency receive signal with a first sampling frequency;
a first digital signal processing module configured to generate a first base band receive signal based on the first digital high frequency receive signal;
a second analog-to-digital converter module configured to generate a second digital high frequency receive signal at least by sampling a second analog high frequency receive signal with the second sampling frequency, wherein the second sampling frequency is equal to the first sampling frequency or equal to the first sampling frequency divided by an integer,
wherein the first analog-to-digital converter module is configured to sample the first analog high frequency receive signal with a first sampling frequency of more than 4 times a band width of the first receive channel; and
a second digital signal processing module configured to generate a second base band receive signal based on the second digital high frequency receive signal.

20. The apparatus according to claim 19, wherein the first sampling rate is larger than $4/M*f_{max,rx}$, wherein $f_{max,rx}$ is the highest carrier frequency of a receive channel with payload data to be converted to the base band domain, wherein M is an integer lower than 10.

21. A method for generating base band receive signals comprising:
generating a first digital high frequency receive signal at least by sampling a first analog high frequency receive signal, wherein the first analog high frequency receive signal comprises first payload data at a first receive channel associated with a first carrier frequency;
generating a first base band receive signal based on the first digital high frequency receive signal;
generating a second digital high frequency receive signal at least by sampling a second analog high frequency receive signal, wherein the second analog high frequency receive signal comprises second payload data at a second receive channel associated with a second carrier frequency, wherein the first carrier frequency differs from the second carrier frequency; and
generating a second base band receive signal based on the second digital high frequency receive signal.

22. A method for generating base band receive signals comprising:
generating a first digital high frequency receive signal at least by sampling a first analog high frequency receive signal with a first sampling frequency;
generating a first base band receive signal based on the first digital high frequency receive signal;
generating a second digital high frequency receive signal at least by sampling a second analog high frequency receive signal with the second sampling frequency, wherein the second sampling frequency is equal to the first sampling frequency or equal to the first sampling frequency divided by an integer; and
generating a second base band receive signal based on the second digital high frequency receive signal.

* * * * *